United States Patent
Yabe

(10) Patent No.: US 8,302,206 B2
(45) Date of Patent: Oct. 30, 2012

(54) APPROPRIATE CONTROL OF ACCESS RIGHT TO ACCESS A DOCUMENT WITHIN SET NUMBER OF ACCESSIBLE TIMES

(75) Inventor: Kenta Yabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 12/366,500

(22) Filed: Feb. 5, 2009

(65) Prior Publication Data

US 2009/0205017 A1 Aug. 13, 2009

(30) Foreign Application Priority Data

Feb. 7, 2008 (JP) ................................. 2008-027697

(51) Int. Cl.
*H04L 29/06* (2006.01)
(52) U.S. Cl. .................................. 726/27; 726/1; 726/2
(58) Field of Classification Search .................. 726/1, 2, 726/26, 27, 31–33; 713/165; 380/233, 201
See application file for complete search history.

(56) References Cited

U.S. PATENT DOCUMENTS

| 7,389,270 B2 * | 6/2008 | Stefik et al. ..................... 705/51 |
| 7,469,050 B2 * | 12/2008 | Kouznetsov et al. ......... 380/284 |
| 2004/0054678 A1 * | 3/2004 | Okamoto et al. ............. 707/100 |
| 2005/0114684 A1 * | 5/2005 | Ohno ............................. 713/187 |
| 2006/0253400 A1 * | 11/2006 | Okamoto et al. ............... 705/57 |
| 2007/0050368 A1 | 3/2007 | Watanabe ......................... 707/9 |
| 2007/0177186 A1 | 8/2007 | Kishimoto ................... 358/1.14 |
| 2007/0271592 A1 | 11/2007 | Noda et al. |

FOREIGN PATENT DOCUMENTS

| JP | 2006209682 A | 8/2006 |
| JP | 2007-058567 | 3/2007 |
| JP | 2007109160 A | 4/2007 |
| JP | 2007129413 A | 5/2007 |
| JP | 2007140846 A | 6/2007 |
| JP | 2007-200140 | 8/2007 |
| JP | 2007310579 A | 11/2007 |

\* cited by examiner

*Primary Examiner* — Ali Abyaneh
(74) *Attorney, Agent, or Firm* — Fitzpatrick, Cella, Harper & Scinto

(57) ABSTRACT

An access right management system is provided, which appropriately controls an access right, to access a document, when the number of executable times is set for each kind of processing on the document managed by a policy server. The management system includes the policy server which saves the access right showing permission or inhibition of access to the document in a first file and a document management server which saves the number of accessible times in a second file. When a predetermined condition is satisfied, the document management server instructs the policy server to update the access right, and the policy server which receives the instructions executes an update of the access right such as changing a permission of access to an inhibition of access.

3 Claims, 16 Drawing Sheets

| POLICY | PROCESS | ACCESS RIGHT DEFINED BY POLICY | NUMBER OF EXECUTABLE TIMES |
|---|---|---|---|
| POLICY A | DISPLAY | PERMIT | — |
|  | EDIT | PERMIT | 5 |
|  | PRINT | PERMIT | 10 |
| POLICY B | DISPLAY | PERMIT | 10 |
|  | EDIT | INHIBIT | — |
|  | PRINT | PERMIT | 10 |

FIG.7

POLICY APPLIED TO DOCUMENT

| POLICY | PROCESSING | ACCESS RIGHT DEFINED BY POLICY | NUMBER OF EXECUTABLE TIMES |
|---|---|---|---|
| POLICY | DISPLAY | PERMIT | — |
| | EDIT | PERMIT | 5 |
| | PRINT | PERMIT | 10 |

POLICY AFTER EXECUTION INSTRUCTION OF DOWNLOAD PROCESS HAS BEEN ISSUED

| POLICY | PROCESSING | ACCESS RIGHT DEFINED BY POLICY | NUMBER OF EXECUTABLE TIMES |
|---|---|---|---|
| POLICY | DISPLAY | PERMIT | — |
| | EDIT | INHIBIT | — |
| | PRINT | INHIBIT | — |

POLICY APPLIED TO DOCUMENT

| POLICY | PROCESSING | ACCESS RIGHT DEFINED BY POLICY | NUMBER OF EXECUTABLE TIMES |
|---|---|---|---|
| POLICY | DISPLAY | PERMIT | – |
| | EDIT | PERMIT | 5 |
| | PRINT | PERMIT | 10 |

POLICY AFTER EXECUTION INSTRUCTION OF DOWNLOAD PROCESS HAS BEEN ISSUED

| POLICY | USER | PROCESSING | ACCESS RIGHT DEFINED BY POLICY | NUMBER OF EXECUTABLE TIMES |
|---|---|---|---|---|
| POLICY | USER WHO HAS DOWNLOADED DOCUMENT | DISPLAY | PERMIT | – |
| | | EDIT | INHIBIT | – |
| | | PRINT | INHIBIT | – |
| | USER OTHER THAN USER WHO HAS DOWNLOADED DOCUMENT | DISPLAY | PERMIT | – |
| | | EDIT | PERMIT | 5 |
| | | PRINT | PERMIT | 10 |

1204 / 1205 / 1206

POLICY APPLIED TO DOCUMENT

| POLICY | PROCESSING | ACCESS RIGHT DEFINED BY POLICY | NUMBER OF EXECUTABLE TIMES |
|---|---|---|---|
| POLICY | DISPLAY | PERMIT | — |
|  | EDIT | PERMIT | 5 |
|  | PRINT | PERMIT | 10 |

POLICY AFTER EXECUTION INSTRUCTION OF
DOWNLOAD PROCESS HAS BEEN ISSUED

| POLICY | PROCESSING | ACCESS RIGHT DEFINED BY POLICY | NUMBER OF EXECUTABLE TIMES |
|---|---|---|---|
| POLICY APPLIED TO DOWNLOADED DOCUMENT | DISPLAY | PERMIT | — |
|  | EDIT | INHIBIT | — |
|  | PRINT | INHIBIT | — |

APPROPRIATE CONTROL OF ACCESS RIGHT TO ACCESS A DOCUMENT WITHIN SET NUMBER OF ACCESSIBLE TIMES

BACKGROUND OF THE INVENTION

1. Field of the Invention

The present invention relates to an access right management system which manages an access right for a document.

2. Description of the Prior Art

In recent years, access right management servers have been developed in which access rights (browsing right, editing right, printing right, or the like) for documents are set in order to prevent information leakage from the documents. In the server, a validity period can also be set for the document. When the validity period expires, any access right set previously is invalidated.

A policy server is known as one access right management server for a document. The policy server issues a policy for a portable document format (PDF) file which is one type of a document and sets the access right and the validity period by applying the policy to the document.

In the related art, there is a technique of achieving a more strong/powerful management of access right for a document by operating the access right management server in combination with a document management server.

According to Japanese Patent Laid-Open No. 2007-058567, in the case where a document managed by the document management server is delivered through e-mail or the like, the access right management server sets an access right for the document corresponding to an access right for the document management server. Delivering the document to be delivered after the access right has been applied thereto prevents information leakage from the document even if the document is delivered to an unintended user.

According to Japanese Patent Laid-Open No. 2007-200140, an access right management server limits not only an access right for a document but also the number of times of operation on the document for which the access right is set, and updates the access right when the number of times of operation reaches the limited number of times.

However, the techniques of the related art are insufficient in controlling an access right of a document managed by a document management server when the same document exists in another device outside the management of the document management server.

SUMMARY OF THE INVENTION

A server provided by the present invention is connected to a different server storing information showing an access right for a document, and comprises a component configured to store the document; a component configured to store the number of accessible times for the stored document; and an update instruction component configured to issue update instructions to the different server to update the information showing an access right when the stored document is downloaded to another device.

With the present invention, control can be performed to appropriately make use of the access right of the document managed by the server as a document management server in accordance with the number of executable times when the number of executable times is set for each processing of the document for which the access right is managed by the alternative server as a policy server. For example, even when the document exists in a device which is separate from the document management server and arranged in a location where use by an indefinite number of users is expected, the access right can be controlled appropriately.

Further features of the present invention will become apparent from the following description of exemplary embodiments (with reference to the attached drawings).

BRIEF DESCRIPTION OF THE DRAWINGS

FIG. 7 is a view showing one example of setting information relating to the access right and the number of executed times thereof of each processing set for the document managed by the document management server;

FIGS. 11A and 11B are views showing examples of the setting information of the policy applied to the document and the policy after a download processing of the document has been executed in Embodiment 2;

FIGS. 12A and 12B are views showing examples of the setting information of the policy applied to the document and the policy after the download processing of the document has been executed in Embodiment 3;

FIGS. 13A and 13B are views showing examples of the setting information of the policy applied to the document and the policy after the download processing of the document has been executed in Embodiment 4;

DESCRIPTION OF THE EMBODIMENTS

[Embodiment 1]

Terms used in this embodiment are be defined below.

I. Access

An "access to a document" includes displaying the document using a client computer in accordance with display instructions from a user, editing the document using the client computer in accordance with edit instructions from the user, and sending a print command of the document to a printer using the client computer in accordance with print instructions from the user.

The display instructions, the edit instructions, and the print instructions are referred to as access instructions.

II. Access Right

An "access right for a document" is authority for causing the client computer to execute a processing (processing with respect to the document) in accordance with the access instructions.

A state where the client computer is permitted to execute the processing (processing with respect to the document) in accordance with the access instructions from a specific user or a class of users is referred to as the user having the access right for the document.

A state where the client computer is inhibited from executing the processing (processing with respect to the document) in accordance with the access instructions from the specific user of the class of users is referred to as the user not having the access right for the document.

The access right includes a viewing right, an editing right, and a printing right.

III. Setting Access Right

To "set an access right" conceptually refers to a provision of the access right for a specific document to a specific user or a specific class of users.

The phrase "set an access right" conceptually means to provide an access right for a specific document to a specific user or a specific class of users. In addition, this phrase also means the processing of creating and saving a file that associates the access right with user information and of applying the file to the specific document.

VI. Policy

A "policy" is a file showing the association above.

Thus, to "set the access right for the document" means to execute the "creation and saving of the policy" and execute the "application of the policy to the document."

V. Policy Server

A "policy server" is a server device which creates and saves the policy. Creating and saving a policy for a document is also referred to as issuing a policy (for a document).

Figure 1:
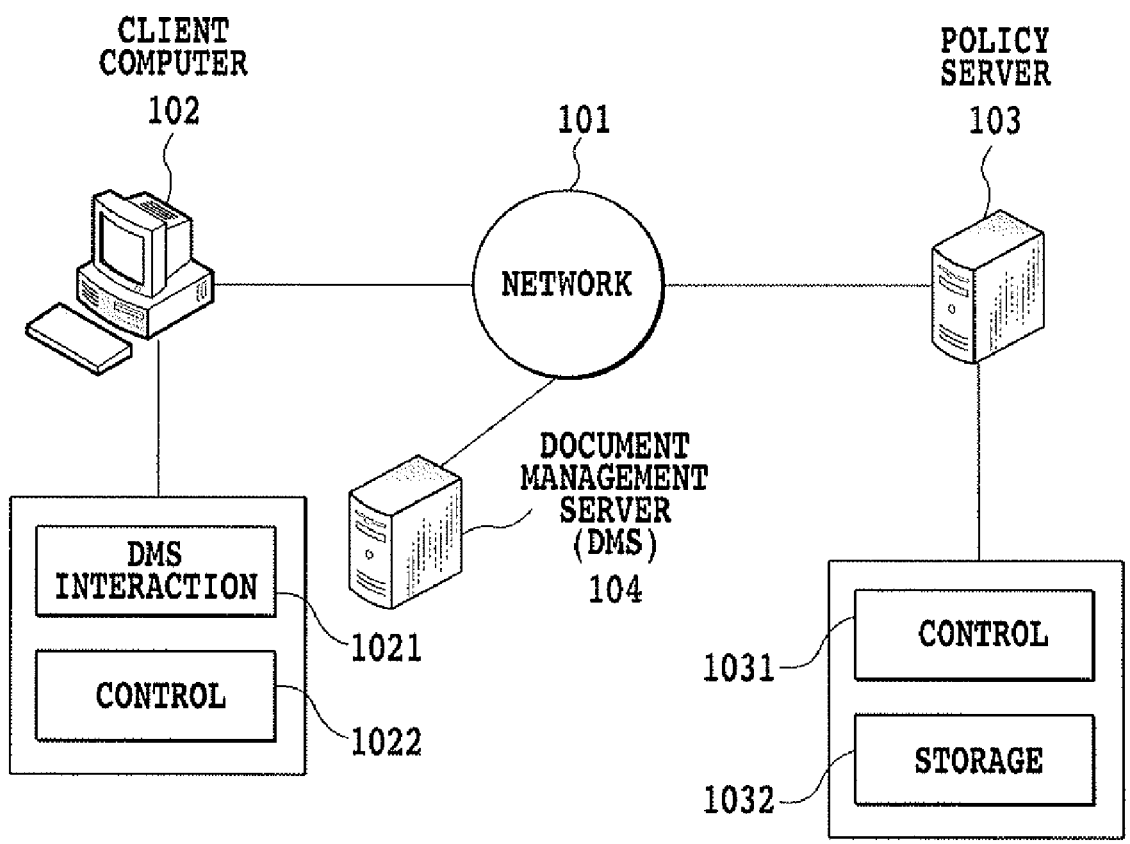
FIG. 1 is a view showing a configuration diagram of a computer system in which a client computer, a document management server, and a policy server operates.

FIG. 1 shows a network 101, a client computer 102, a policy server 103, and a document management server (a different server, hereinafter called DMS) 104. The network 101 operates as a communication line for exchanging information between the devices described above. For example, it is a communication line network supporting a TCP/IP protocol or the like, and the lines may be wired or wireless.

The client computer 102 includes a DMS interaction portion 1021 and a control portion 1022. The control portion 1022 serves a general and known role of a client computer. For example, software for creating and viewing a PDF file is installed in the control portion 1022. Further, the control portion 1022 can perform a part of each of the processings in the flowcharts described later.

The DMS interaction portion 1021 can perform operations in collaboration with the DMS 104. The DMS interaction portion 1021 can perform a part of each of the processings in the flowcharts described later. Further, what is important in each of the embodiments according to the present invention is that all of the contents of the processings performed by the DMS interaction portion 1021 can be stored in the DMS 104. That is, the DMS 104 can serve to monitor the DMS interaction portion 1021 in the client computer 102. Note that, since the monitoring technique of the client computer by the server is known, detailed descriptions thereof will be omitted herein. It is clear to those skilled in the art that a number of such known techniques are achieved by installing applications of the same type in the server and the client computer. In addition to the monitoring of the DMS interaction portion 1021, the DMS 104 can also save the document.

In addition, the DMS 104 can interact with the policy server 103 in a similar manner to the client computer 102. The DMS 104 can perform a part of each of the processings of the flowcharts described later. Further, it is important in each of the embodiments according to the present invention that the policy server 103 can store all of the contents of the processings performed by the DMS 104 in a storage device 1032. That is, the policy server 103 can serve to monitor the DMS 104. Note that, since the monitoring technique using the server is known as described above, detailed descriptions thereof will be omitted herein.

The policy server 103 includes a control portion 1031 and the storage device 1032. The control portion 1031 can perform a part of each of the processings in the flowcharts described later.

The storage device 1032 serves a general and known role as a storage device of a server. For example, it saves a policy created by create instructions from the client computer 102, an operation log of a document to which the policy is applied, information of a user using the document to which the policy is applied, or the like. Further, in addition, the storage device 1032 can be referred to and used in the processings of the flowcharts described later.

<Issuance of Policy (Hereinafter Called Online Policy) Requiring Document to be Used in Online Environment>

Figure 2:
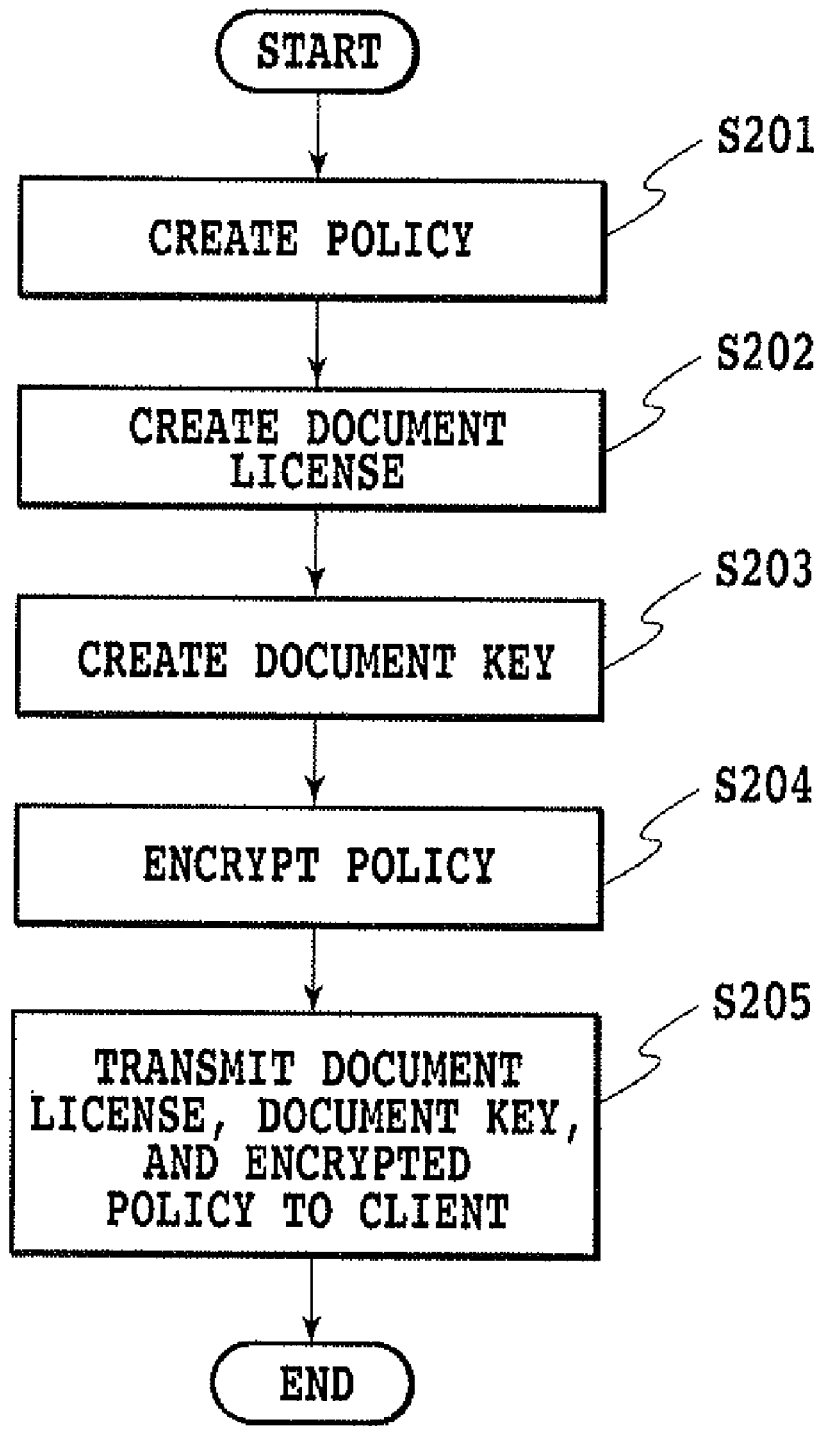
FIG. 2 is a view showing a flowchart of the policy server creating an online policy.
Figure 3:
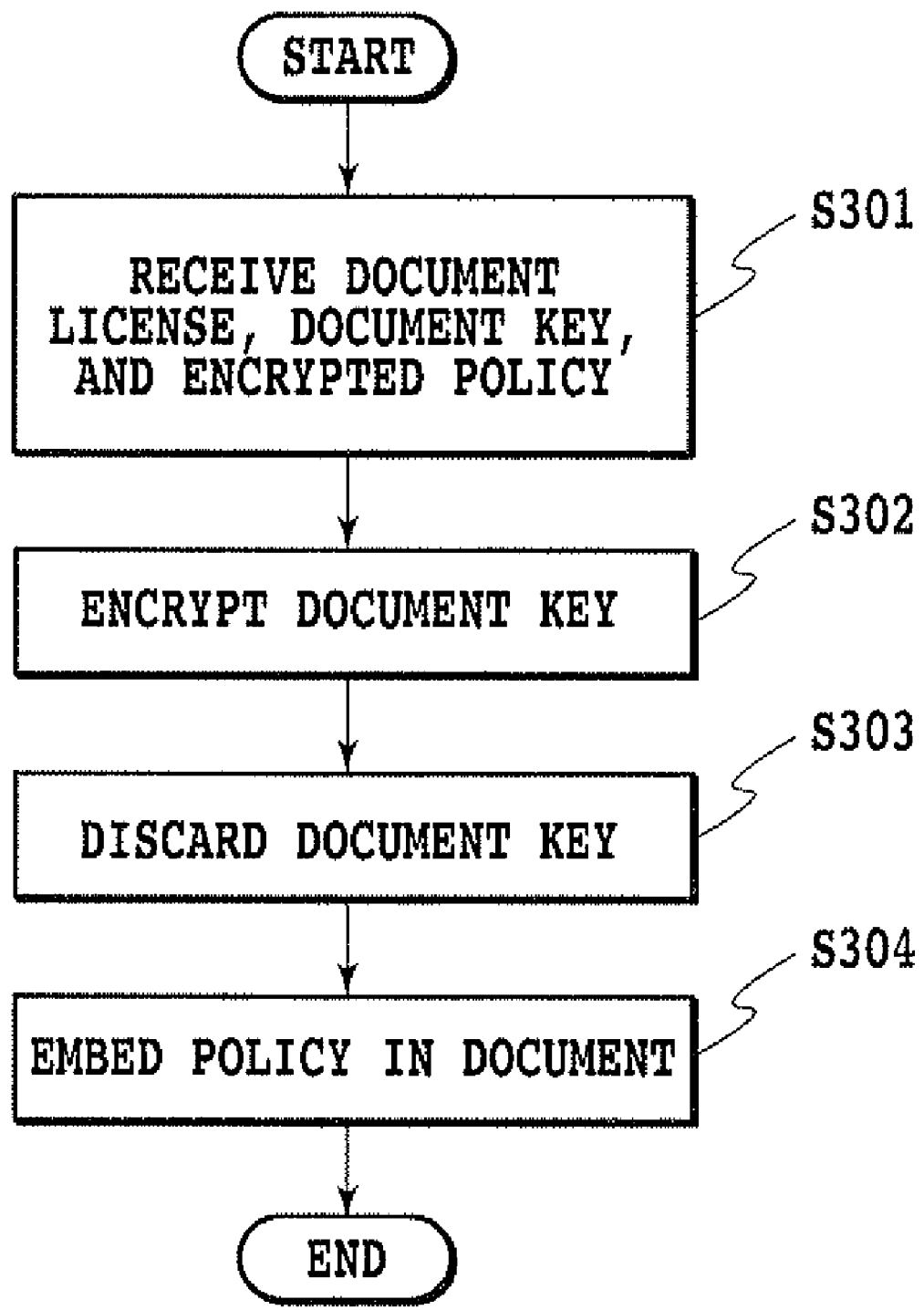
FIG. 3 is a view showing a flowchart of the client computer applying the online policy to a document.

FIG. 2 is a flowchart of when the policy server 103 issues an online policy, and FIG. 3 is a flowchart of when the client computer 102 applies the online policy to the document (for example, a PDF file).

Upon receiving an online policy create instructions from the user, the client computer 102 notifies the policy server 103 of the instructions. Note that the online policy create instructions include: create instructions, to the policy server 103, of the online policy; and instructions, to the policy server 103, on content of the online policy to be created.

Note that the instructions showing the "content of the online policy to be created" is in other words instructions showing "what access rights to be set for each user."

When the policy server 103 receives the online policy create instructions, a processing of S201 is started.

In S201, the policy server 103 creates and saves the online policy based on the online policy create instructions for a designated document. Note that the online policy is a file (first file) showing what access rights to be set for a user having a certain user ID. In other words, it is a file showing associations between the user information and the access right.

In S202, the policy server 103 creates a document license including policy server identification information and policy identification information. The policy server identification information is information for uniquely identifying the policy server, and is, for example, an IP address. The policy identification information is information for identifying the online policy saved in the policy server, and is, for example, an ID.

In S203, the policy server 103 provides a digital signature to the document license and ensures consistency of data. Further, the policy server 103 creates a document key (as one type of encryption key) to be used later for encrypting the document. The document key is created for each document to which the online policy is applied, and is a unique document key for the designated document in the embodiment.

In S204, the policy server 103 encrypts the online policy created in S201.

In S205, the policy server 103 associates the document license, the document key, and the encrypted online policy with each other and transmits them to the client computer 102. Further, in S205, the encrypted online policy, the policy identification information, and the document key transmitted to the client computer 102 are, although transmitted, associated and saved inside the policy server 103.

In S301, the client computer 102 receives the document license, the document key, and the encrypted online policy associated with each other from the policy server 103. Then, the control portion 1022 in the client computer 102 in which the software for creating and viewing a PDF file is installed applies the online policy to the designated document.

A processing of this application is shown in S302, S303, and S304.

First, in S302, the control portion 1022 in the client computer 102 encrypts the document using the received document key. When the encryption is completed, the processing proceeds to S303.

In S303, the control portion 1022 in the client computer 102 judges that the document key is now unnecessary since the encryption is finished, and discards the document key.

In S304, the control portion 1022 in the client computer 102 embeds the document license and the encrypted online policy in the encrypted document. Accordingly, the processing of applying the online policy to the document is terminated.

<Registration in DMS of Document to Which Online Policy is Applied>

Figure 6:
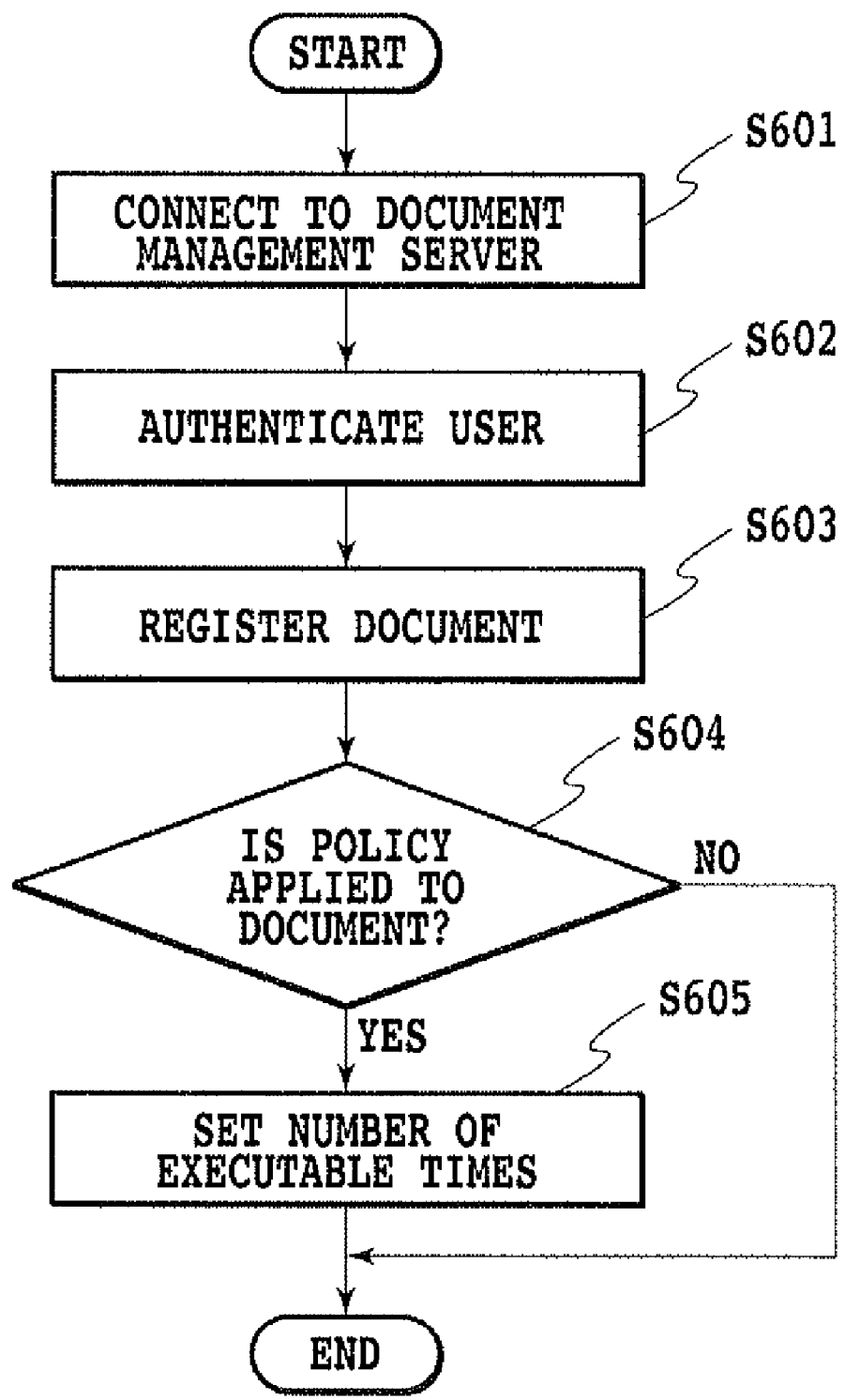
FIG. 6 is a view showing a flowchart of the document management server setting the number of executable times for the document to which the policy is applied.

FIG. 6 is a flowchart of when the document to which the online policy is applied is registered in the DMS. The online policy is a policy requiring a document to be used in an online environment.

Note that, since a document management technique in the DMS is known, detailed descriptions of processings in the DMS will be omitted herein.

When the user has instructed the control portion 1022 to register the document in the DMS 104, the following processing is performed.

When the control portion 1022 receives document register instructions from the user, the DMS interaction portion 1021 interacts with the DMS 104 to perform the registration of the document.

In S601, the DMS interaction portion 1021 first connects to the DMS 104 via a network in order to interact with the DMS 104 and perform the following processing. Further, when connecting, the DMS interaction portion 1021 in the client computer 102 transmits a user name and a password received from the user to the DMS 104.

In S602, the DMS 104 performs authentication with the user name sent from the DMS interaction portion 1021 in the client computer 102. When the authentication succeeds, the DMS interaction portion 1021 in the client computer 102 transmits, to the DMS 104, information necessary for executing the document register instructions in the DMS 104.

Note that the information transmitted from the DMS interaction portion 1021 in the client computer 102 is information necessary for identifying the document registered in the DMS 104. For example, it is a name of the document, registrant name, registration date and time, or the like, and detailed descriptions regarding detailed information content thereof will be omitted.

In S603, the DMS 104 receives the document to be registered and the information necessary when executing the registration from the DMS interaction portion 1021 in the client computer 102 to thereby execute a registration processing. The document and the information necessary when executing the regeneration which accompanies the document are both stored in the DMS 104.

In S604, the DMS 104 checks whether the policy created by the policy server 103 is applied to the document registered in S603. If the policy is not applied, the registration processing is terminated. If the policy is applied, S605 is executed.

In S605, the DMS 104 sets the number of executable times for each processing (displaying, editing, printing, or the like), the access right of which is managed by the policy applied to the document registered in S603. The number of executable times set in S605 is stored in a file (second file) of the DMS 104.

<Setting of Number of Executable Times of Processing, Access Right of Which is Managed by Policy>

FIG. 7 shows information managed by the DMS 104 in which the policy is associated with the number of executable times set in S605 for each processing, the access right of which is managed by the policy.

The number of executable times 703 can only be set for a processing 701 for which a policy-defined access right 702 is permitted. If the policy-defined access right 702 is inhibited for the processing 701, the number of executable times 703 cannot be set.

Note that a setting is also possible in which the number of executable times 703 is not set even for the processing 701 for which the policy-defined access right 702 is permitted. In this case, the processing can be executed with no limit on the number of executed times.

<Access to Document Used in Online Environment>

Figure 8:
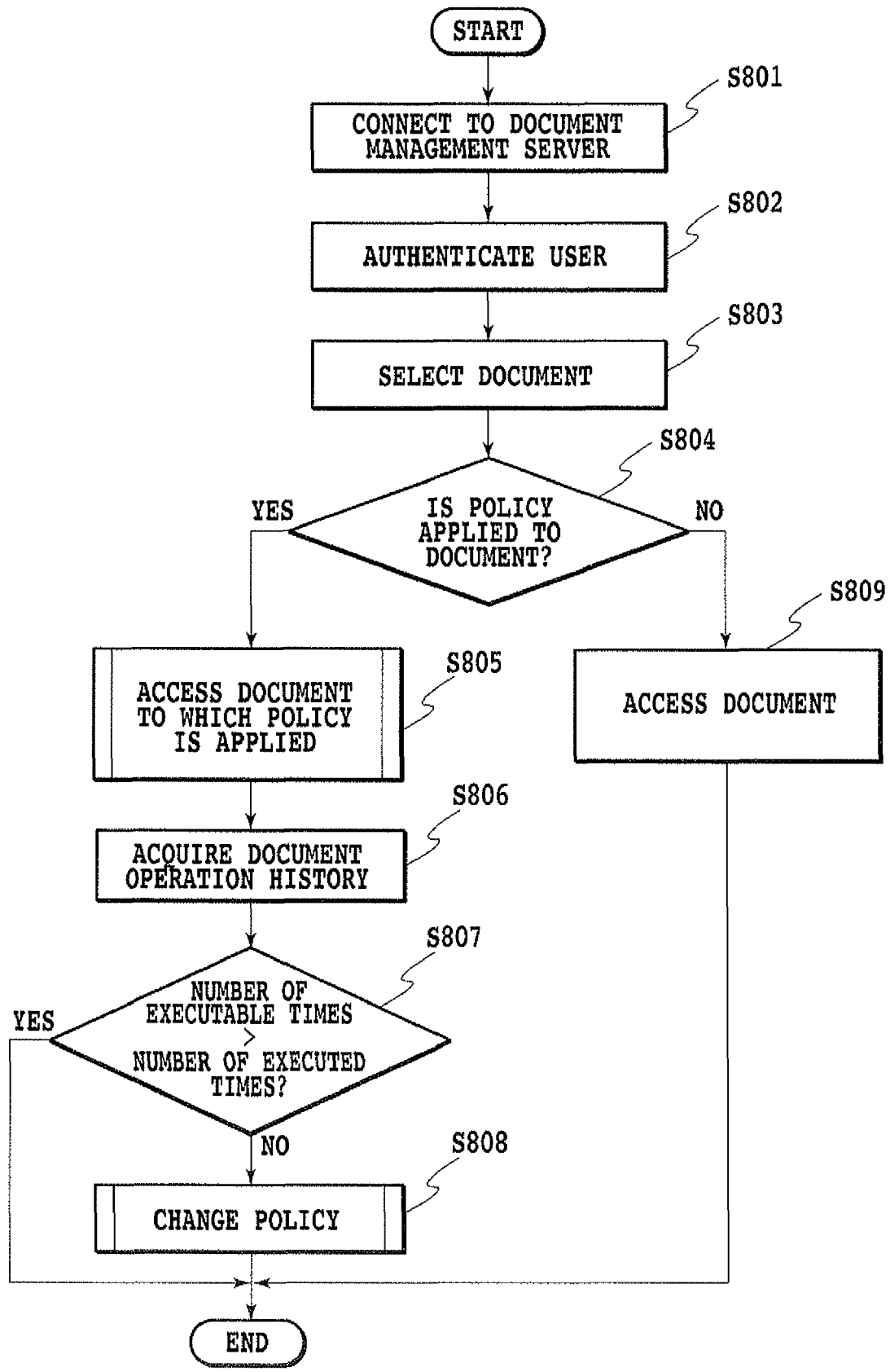
FIG. 8 is a view showing a flowchart of the client computer accessing the document managed by the document management server.

FIG. 8 is a flowchart of when the document managed by the DMS 104 is accessed.

Figure 4:
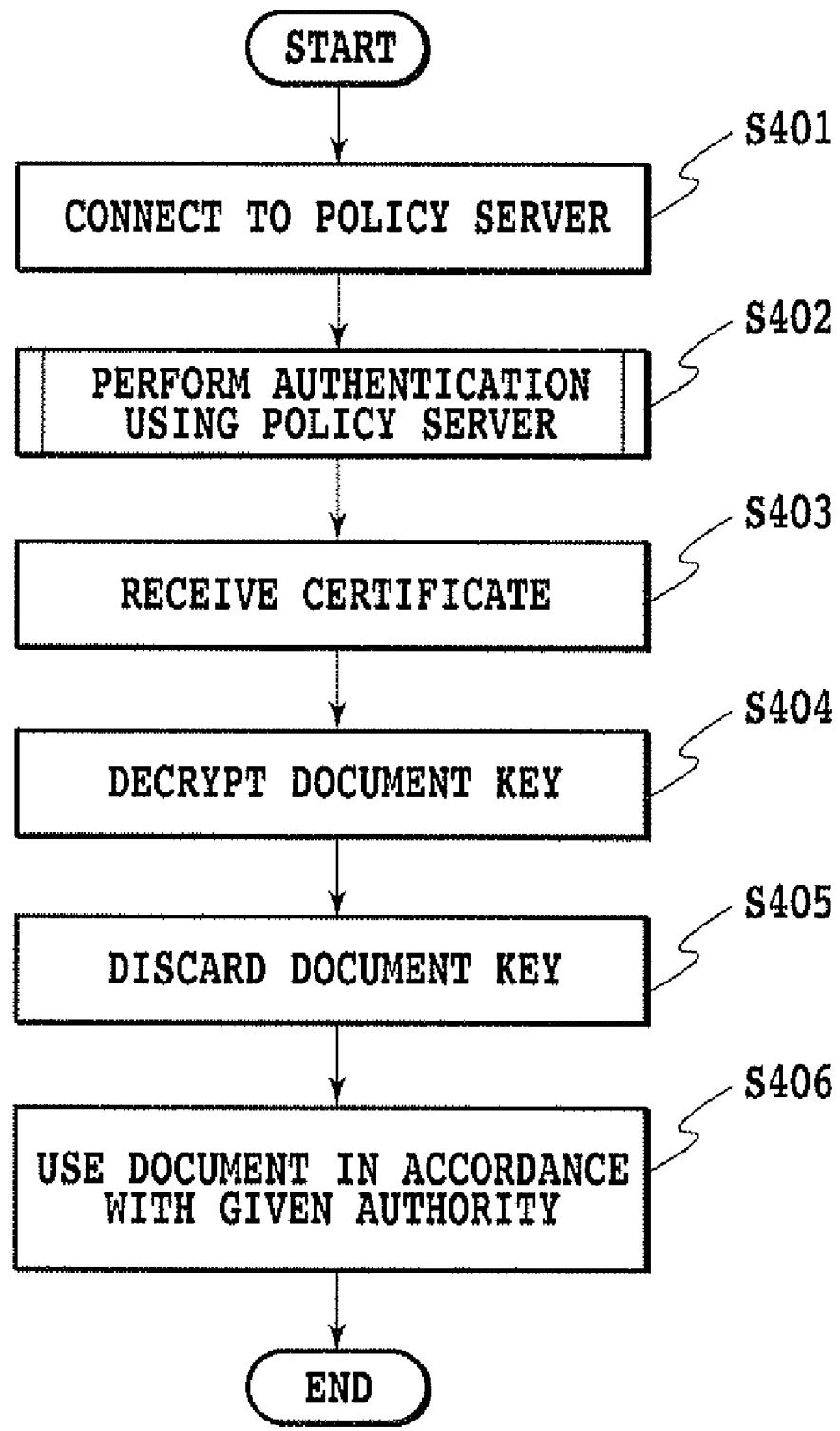
FIG. 4 is a view showing a flowchart of the client computer accessing the document to which the online policy is applied.

Note that the embodiment is described on the assumption that a device which accesses the document (i.e., a device which performs a processing of FIG. 4 described later) is the same as a device which applies the online policy to the document (i.e., a device which performs a processing of FIG. 3). That is, the embodiment is described on the assumption that a device which performs the processing of FIG. 4 is the client computer 102. Note that, even if a device which performs the processing of FIG. 3 and a device which performs the processing of FIG. 4 differ, the processing illustrated in FIG. 3 and the processing illustrated in FIG. 4 do not change in any way.

When the control portion 1022 is given instructions in which a user accesses the document managed by the DMS 104, the following processings are performed.

In S801, the DMS interaction portion 1021 connects to the DMS 104 in order to interact with the DMS 104 and execute the following processing. Further, when connecting, the DMS interaction portion 1021 in the client computer 102 transmits the user name and the password received from the user to the DMS 104.

In S802, the DMS 104 performs authentication with the user name sent from the DMS interaction portion 1021 in the client computer 102. When the authentication succeeds, the DMS interaction portion 1021 in the client computer 102 transmits, to the DMS 104, information designating the document to be accessed.

In S803, the DMS 104 retrieves the document corresponding to document designation information sent from the DMS interaction portion 1021 in the client computer 102 from the documents stored in the DMS 104.

Note that, if the corresponding document does not exist in the documents stored in the DMS 104 in S803, the result is returned to the client computer 102.

If the document designated by the user is found in S803, the DMS 104 checks in S804 whether the policy is applied to the document found in S803.

If the policy is applied to the document in S804, the DMS interaction portion 1021 in the client computer 102 accesses the document to which the policy is applied in S805. On the other hand, if the policy is not applied to the document, the DMS interaction portion 1021 accesses the document in S809 without particular restrictions.

A processing of S805 is shown in detail in FIG. 4.

FIG. 4 is a flowchart of when the client computer 102 accesses the document to which an online policy is applied. The online policy is a policy requiring the document to be used in an online environment.

In S401, the DMS interaction portion 1021 connects to the policy server via the DMS 104 in order to download the document to which the online policy is applied to a temporary file of the DMS interaction portion 1021 and access the document. Note that the DMS interaction portion 1021 finds the policy and the policy server in which the policy applied to the document is saved, in accordance with the document license embedded in the document. The document license includes the policy server identification information and the policy identification information. Note that, in this embodiment, the policy server identified by the policy server identification information is the policy server 103. The policy identified by the policy identification information is the policy saved inside the policy server 103 in association with the policy identification information in S205.

Further, when connecting, the DMS interaction portion 1021 in the client computer 102 transmits the user name and the password received from the user to the policy server 103.

In S402, the policy server 103 performs authentication with the user name sent from the DMS interaction portion 1021 in the client computer 102. When the authentication succeeds, the policy server 103 checks the content of the policy identified (specified) by the policy identification information and transmits a certificate file described later in FIG. 5 to the DMS interaction portion 1021.

Figure 5:
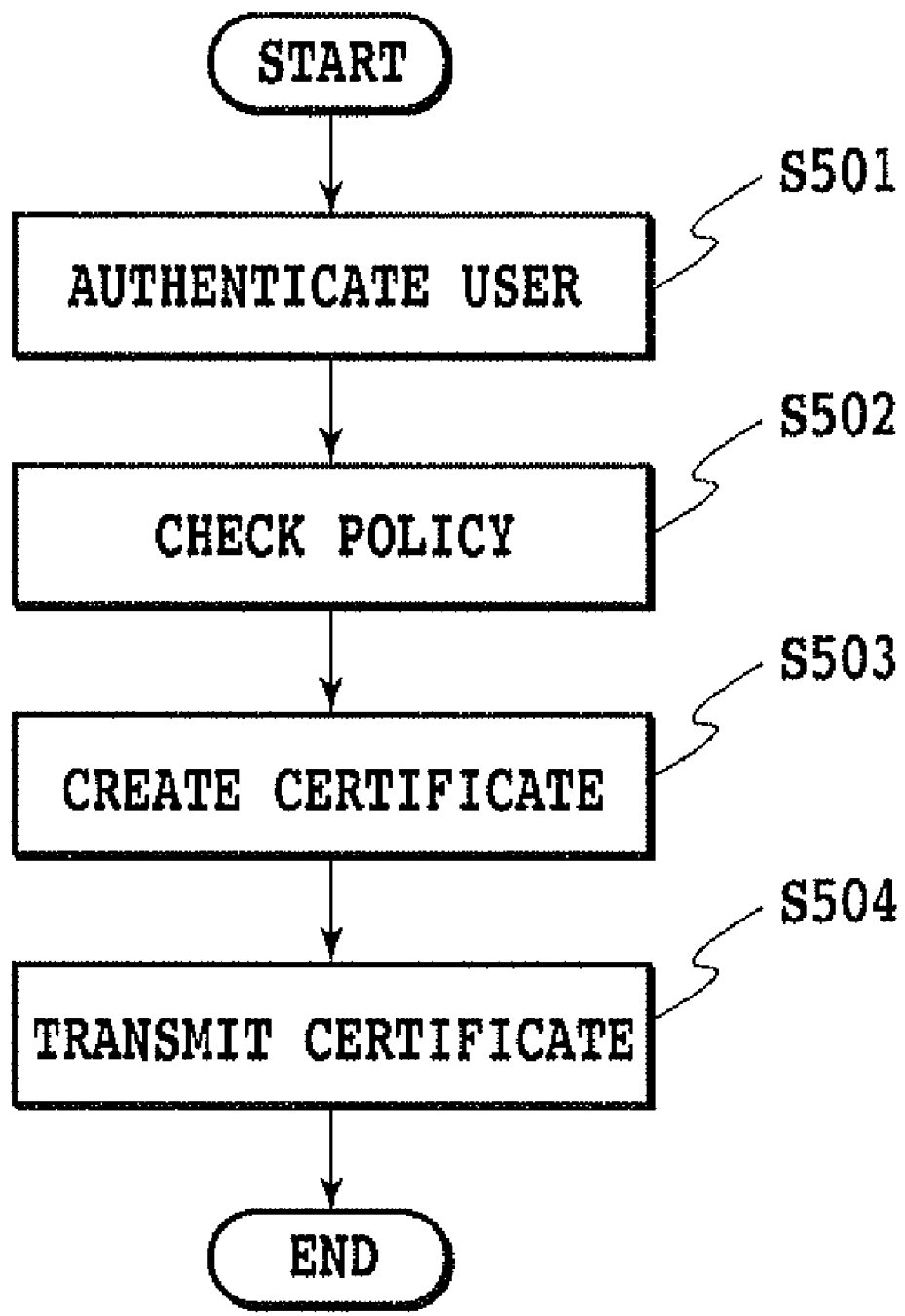
FIG. 5 is a view showing a flowchart of the policy server transmitting an access right defined by the online policy to the client computer.

A processing of S402 is shown in FIG. 5 in details.

FIG. 5 is a flowchart showing an authentication processing of the online policy performed by the policy server 103.

In S501, the policy server 103 performs the authentication (checking of whether the correct password has been inputted) with the user name received from the client computer 102. Then, the user information saved in association with the user name (in the policy server 103) is acquired.

In S502, the policy server 103 cross-checks the found online policy and the user information acquired in S501, and checks the access right of the user having the user ID for the document (access right of the user of the user information). The policy server 103 reads the document key saved in S205 (document key associated with the online policy) from the location where the document key is saved.

In S503, the policy server 103 creates the certificate file including the document key and the access right of the user specified by the user information.

In S504, the policy server 103 transmits the certificate file created in S503 to the client computer 102.

In S403, the DMS interaction portion 1021 in the client computer 102 receives the certificate file transmitted from the policy server 103 and starts the access to the document.

In S404, the DMS interaction portion 1021 decrypts the document corresponding to the certificate file using the document key included in the certificate file. When the decryption is completed, the processing proceeds to S405.

In S405, the DMS interaction portion 1021 discards the document key of the document for which the decryption has been finished.

In S406, the DMS interaction portion 1021 controls the access to the document in accordance with the access right included in the certificate file. That is, the DMS interaction portion 1021 can execute only a processing permitted by the access right. The client computer 102 discards the certificate file at the point when the access to the document is terminated.

In S406, a history of the access performed with respect to the document to which the online policy is applied is stored in the storage device 1032 in the policy server 103. The history of the access includes, for example, identification information of the user who has accessed the document, identification information of the policy applied to the document, information on a processing (displaying, editing, printing, or the like) of the access, date and time information of the access, or the like.

Next, a flowchart shown in FIG. 8 will be described.

In S806, the DMS 104 acquires the access history stored in the storage device 1032 in the policy server 103, and counts the number of executed times, up to that point, of the processing permitted by the access right defined by the policy applied to the document.

In S807, the DMS 104 judges whether or not a predetermined condition is satisfied by comparing the number of executed times of each processing counted in S806 with the number of executable times stored in the DMS 104 and set in S605. In this embodiment, the predetermined condition refers to the number of executed times of each processing reaching the number of executable times. If the number of executed times of each processing has not reached the number of executable times, the process is terminated.

If the number of executed times of each processing has reached the number of executable times in S807, the DMS 104 issues update instructions of the policy applied to the document, and updates the online policy by interacting with the policy server 103 in S808.

Figure 9:
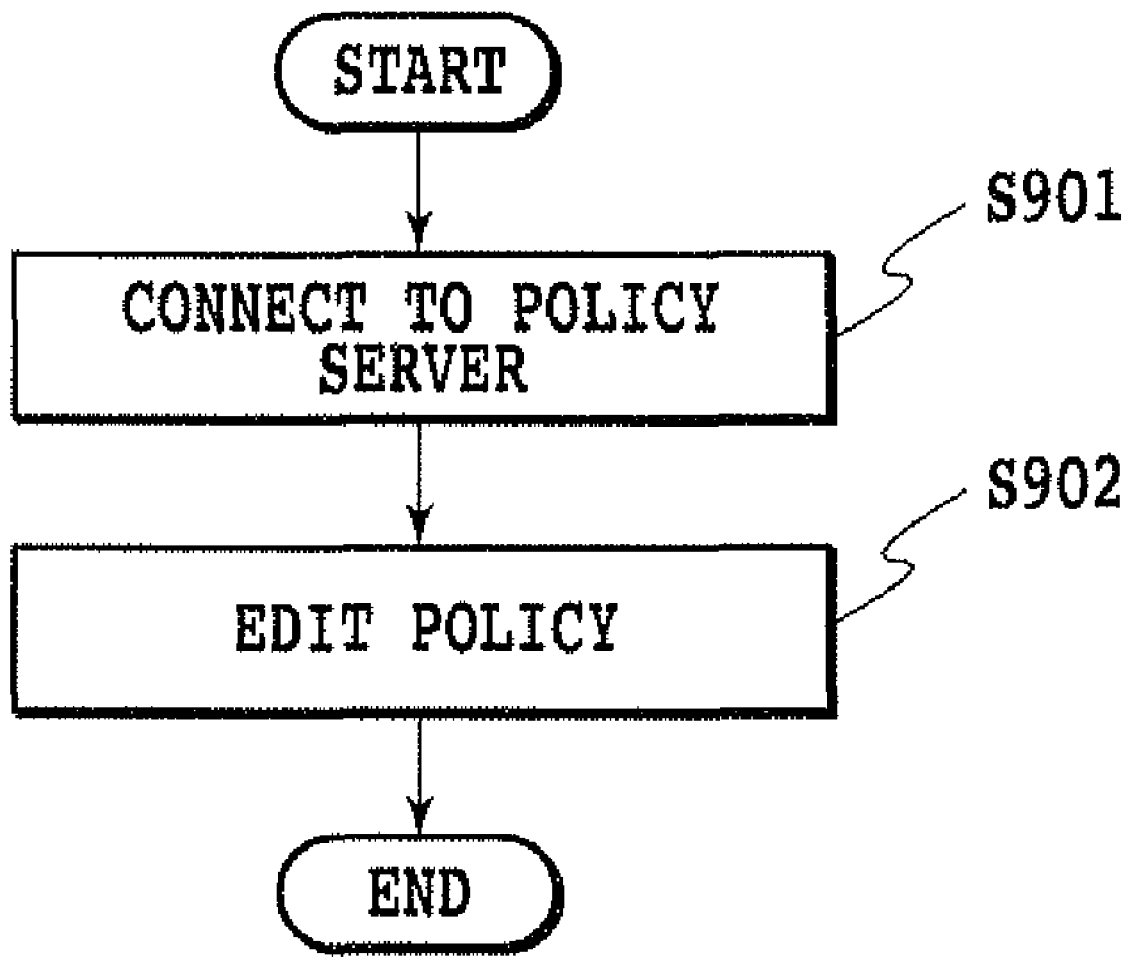
FIG. 9 is a view showing a flowchart for updating the policy managed by the policy server.

A processing of S808 is shown in detail in FIG. 9.

FIG. 9 is a flowchart showing an update processing of the online policy performed in the policy server 103.

In S901, the DMS 104 first connects to the policy server 103 via the network 101 to interact with the policy server 103 and perform the update processing of the policy.

In S902, the policy server 103 updates the policy stored in the storage device 1032 in accordance with the update instructions of the policy transmitted from the DMS 104. For example, when a document to which a policy A shown in FIG. 7 is applied is edited five times, a permission of the access right corresponding to editing is updated to inhibition in S902.

[Embodiment 2]

In Embodiment 1, the number of executable times is set as a limit value of each processing for which the access right is managed by the online policy in the DMS 104 when the document to which the online policy is applied is managed by the DMS 104.

In Embodiment 2, the policy is updated in order to control the number of executed times of the processing permitted by the policy managed by the DMS 104 in the case where a download processing has been executed on the document managed by the DMS 104. The case where the download processing is executed refers to a situation where the same document exists also in a device, e.g., the client computer 102, outside the management of the DMS 104.

Note that this situation also includes a situation where the control portion 1022 in the client computer 102 can access the document without involving the DMS 104 in any of two ways, one of which only includes the steps shown in FIG. 4 and the other of which includes the steps shown in either FIG. 8.

Therefore, in the descriptions below, the alternative device outside the management of the DMS is the client computer 102, and the client computer 102 is the device that accesses the document. However, if the access to the document is possible by only the steps of FIG. 4, the device outside the management of the DMS may be the same device as the DMS 104.

When accessing the document to which the policy managed by the DMS 104 is applied, the access is executed with the steps of FIG. 8 as described in Embodiment 1. When the same document as the document managed by the DMS 104 exists in the client computer 102 and the control portion 1022 in the client computer 102 accesses the document without involving the DMS 104, the access is executed with the steps of FIG. 4.

Note that the documents existing in the respective devices are the same files. Therefore, the document licenses embedded in the documents include the same policy server identification information and the policy identification information.

As long as the control portion 1022 accesses the document existing in the client computer 102, S801, S802, and S808 shown in FIG. 8 are not executed. Thus, the processing for which the number of executable times is set in the policy stored in the DMS 104 can be executed regardless of the number of executable times.

A document operation history acquired in S806 reflects operation histories of both of the document managed by the DMS 104 and the document existing in the client computer 102.

Therefore, when the download processing is executed for the document, there is a possibility that S808 is executed even if the number of times executed with the steps of FIG. 8 is less than the number of executable times stored in the DMS 104.

In Embodiment 2, in order to prevent the situation described above, the policy is updated regarding the processing for which the number of executable times is set and then the download processing is executed when the download processing is to be executed for the document managed by the DMS 104.

Figure 10:
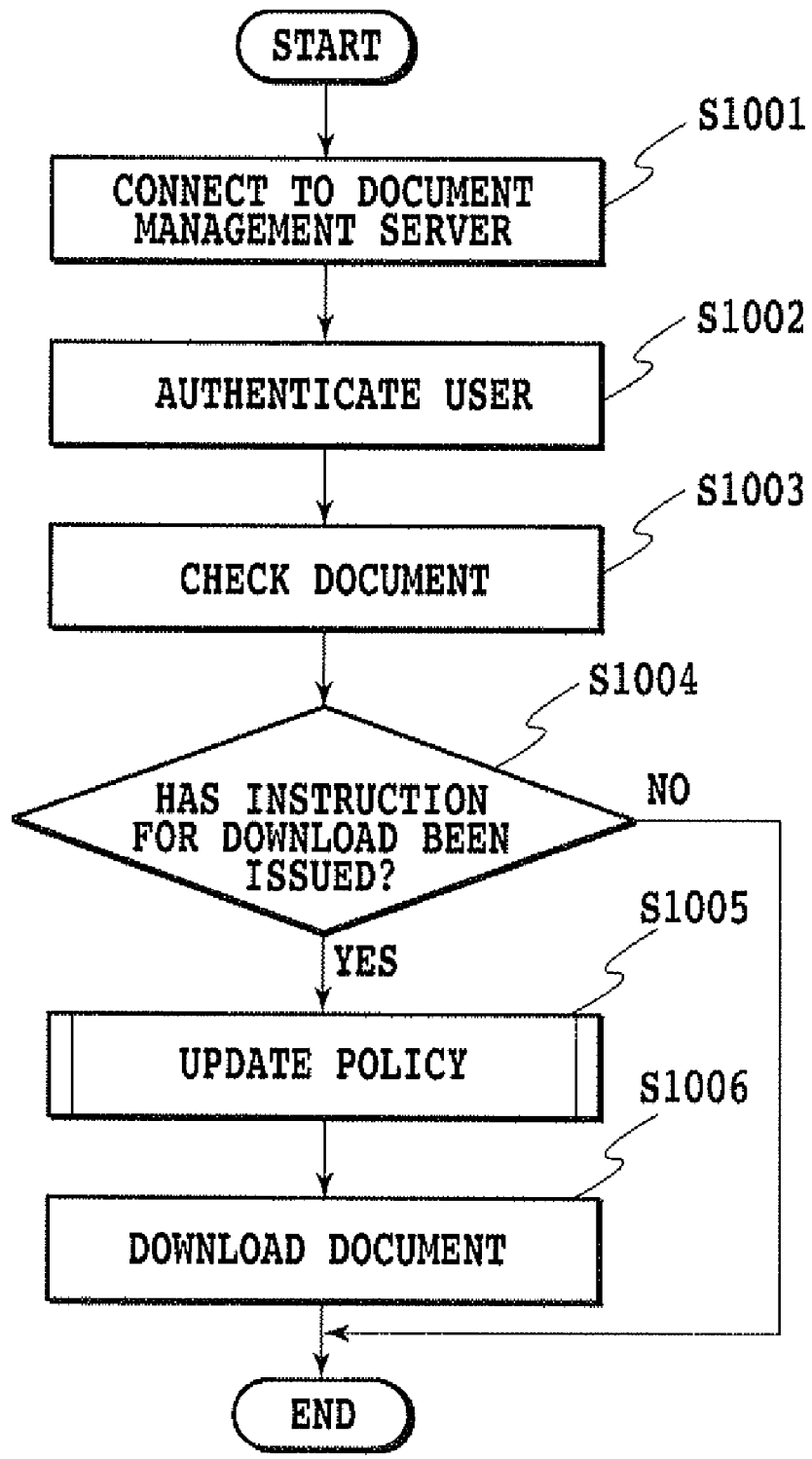
FIG. 10 is a view showing a flowchart for downloading the document to which the policy is applied from the document management server.

FIG. 10 is a flowchart showing the update processing of the online policy executed before the document to which the online policy managed by the DMS 104 is applied is downloaded. Note that the device that instructs the execution of the update processing is the DMS 104, and the DMS 104 issues the policy update instructions to the policy server 103.

When the instructions for downloading the document managed by the DMS 104 are issued to the DMS interaction portion 1021, the following processing is performed.

In S1001, the DMS interaction portion 1021 first connects to the DMS 104 in order to interact with the DMS 104 and execute the following processing. Further, when connecting, the DMS interaction portion 1021 in the client computer 102 transmits, to the DMS 104, the user name and the password received from the user.

In S1002, the DMS 104 performs authentication with the user name sent from the DMS interaction portion 1021 in the client computer 102. When the authentication succeeds, the DMS interaction portion 1021 in the client computer 102 transmits, to the DMS 104, information designating the document to be accessed.

In S1003, the DMS 104 retrieves the document corresponding to document designation information sent from the DMS interaction portion 1021 in the client computer 102 from documents stored in the DMS 104.

Note that, if the corresponding document does not exist in the documents stored in the DMS 104 in S1003, the result is returned to the client computer 102.

If the document designated by the user is found in S1003, the DMS 104 checks, in S1004, whether download instructions have been transmitted from the DMS link portion 1021 in the client computer 102.

If the download instructions have been transmitted, the DMS 104 transmits the update instructions of the policy to the policy server 103 and updates the policy applied to the document to be downloaded in S1005.

Details of processings of S1005 are similar to S901 and S902 shown in FIG. 9.

FIGS. 11A and 11B are views showing the contents of the policy updated in S1005. Note that information of the access right defined by the policy and information of the number of executable times set for the processing having the access right defined therefor shown in FIGS. 11A and 11B are stored in the DMS 104.

For a policy 1101 applied to the document, execution of an edit processing 1102 is permitted up to five times, and execution of a print processing 1103 is permitted up to ten times. The policy 1101 is updated to a policy 1104 as a result of the processing of S1105. The policy 1104 is a policy which defines the access right inhibiting an edit processing 1105 and a print processing 1106.

Note that the policy 1101 and the policy 1104 are stored as the same file in the storage device 1032 in the policy server 103.

In S1006, the DMS 104 transmits the document to which the policy is applied to the client computer 102.

In Embodiment 2, it is judged that an appropriate use of the access right managing each processing for which the number of executable times is set by the DMS 104 is difficult at the point when the document has been downloaded. (It is judged that history information acquired in S806 and the processing of S807 themselves decrease in credibility.) Therefore, by updating the policy to inhibit the execution of each processing, an effect can be obtained in which inconsistency of the policy is prevented in advance in the event of an unexpected document use.

[Embodiment 3]

In Embodiment 2, when the download processing is executed for the document managed by the DMS 104, the execution of the processing for which the number of executable times is set by the DMS 104 is inhibited by updating the policy.

In Embodiment 3, when the download processing is executed for the document managed by the DMS 104, a policy applied only to the user who has executed the download processing is added. Accordingly, only the user who has executed the download processing is inhibited from executing the processing for which the number of executable times is set by the DMS 104.

Steps and configuration, in Embodiment 3, of processings of adding the policy applied only to the user who has executed the download processing to the policy managed by the policy server 103 are similar to the update processing performed based on the flowchart shown in FIG. 10. Note that the device that instructs the execution of the addition (update) processing is the DMS 104, and the DMS 104 issues the policy update instructions to the policy server 103.

FIGS. 12A and 12B are views showing the contents of the policy added (updated) in S1005 in Embodiment 3. Note that information of the access right defined by the policy and information of the number of executable times set for the processing having the access right defined therefor shown in FIGS. 12A and 12B are stored in the DMS 104. The information for identifying the user who has performed the download is stored in a similar manner to the user information stored in the storage device 1032 in the policy server 103.

For a policy 1201 applied to the document, execution of an edit processing 1202 is permitted up to five times, and execution of a print processing 1203 is permitted up to ten times. The policy 1201 is updated to a policy 1204 by an addition of a policy 1205 applied only to the user who has downloaded the document as a result of the processing of S1105. The policy 1205 inhibits the execution of the edit processing and the print processing. A policy 1206 is a policy applied to a user other than the user who has downloaded the document.

When the user who has downloaded the document is to access the document, the policy 1205 is applied in S502.

In Embodiment 3, unlike in Embodiment 2, each access to the document by a user who has not executed the download processing is not inhibited. By inhibiting each access of only the user who has downloaded the document, an appropriate control of the number of executable times of each processing of the document set by the DMS 104 is achieved.

[Embodiment 4]

In Embodiments 2 and 3, when the download processing for the document managed by the DMS 104 is executed, the execution of the processing for which the number of executable times is set by the DMS 104 is inhibited for the user who has downloaded the document by updating the policy.

In Embodiment 4, unlike in Embodiments 2 and 3, when the download processing for the document managed by the DMS 104 is executed, a policy differing from the policy applied up to that point is newly created and applied to the document.

Steps and configurations of a processing of newly creating and applying the policy for the document for which the download processing has been executed in Embodiment 4 are similar to an issuance processing of the policy performed based on the flowcharts shown in FIGS. 2 and 3. Note that the device that instructs the execution of the issuance processing is the DMS 104, and the DMS 104 issues policy issuance instructions to the policy server 103.

FIGS. 13A and 13B are views showing the contents of the policy issued in S201 in Embodiment 4. Note that information of the access right defined by the policy and information of the number of executable times set for the processing having the access right defined therefor shown in FIGS. 13A and 13B are stored in the DMS 104.

For a policy 1301 applied to the document, execution of an edit processing 1302 is permitted up to five times, and execution of a print processing 1303 is permitted up to ten times.

When the download processing for the document managed by the DMS 104 is executed, in S201, a policy 1304 inhibiting the access right of each processing for which the number of executable times is set by the DMS is issued.

The policy 1304 is newly applied to the document for which the download processing has been executed. Note that, by applying the policy 1304 to the document for which the download processing has been executed, the document license embedded in the document in S304 is also changed. That is, the policy identification information also differs between the document managed by the DMS 104 and the document for which the download processing has been executed. Therefore, the access to the downloaded document is not recorded in the document operation history acquired by the DMS in S806.

In Embodiment 4, unlike in Embodiments 2 and 3, the policy applied to the document for which the download processing has been executed is newly created and applied. Accordingly, even for the user who has executed the download processing, the execution of the processing for which the number of executable times is set by the DMS can be permitted as long as the document managed by the DMS 104 is accessed by the user.

[Embodiment 5]

In Embodiment 4, a new online policy is created and applied for the document for which the download processing is executed.

In Embodiment 5, a policy which does not need to be used online is applied to the document for which the download processing is executed.

The contents of the policy applied to the document for which the download processing is executed do not differ between the online policy of Embodiment 4 and the policy of Embodiment 5 that permits an offline use of the document. However, there is a difference between an application method of the policy for the document and an access method for the document.

<Creation of Policy (Hereinafter Offline Policy) that Permits Offline Use of Document>

Figure 14:
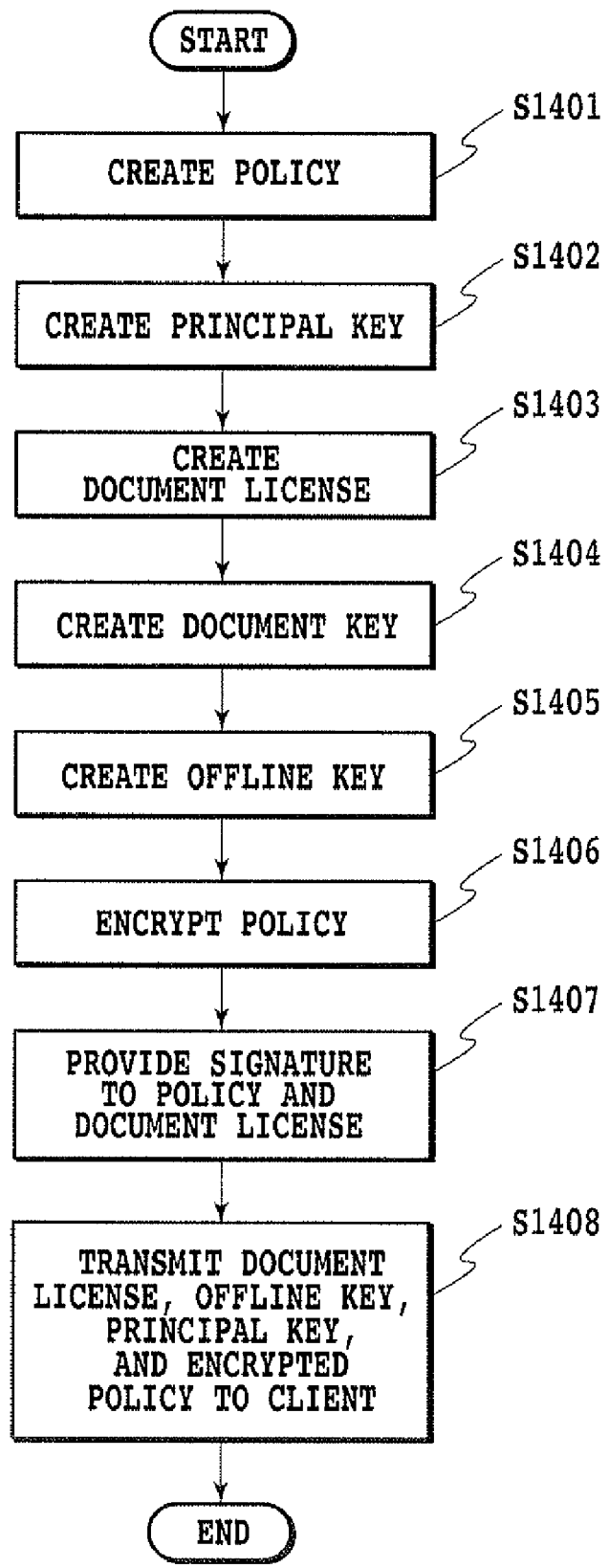
FIG. 14 is a view showing a flowchart of the policy server creating an offline policy.
Figure 15:
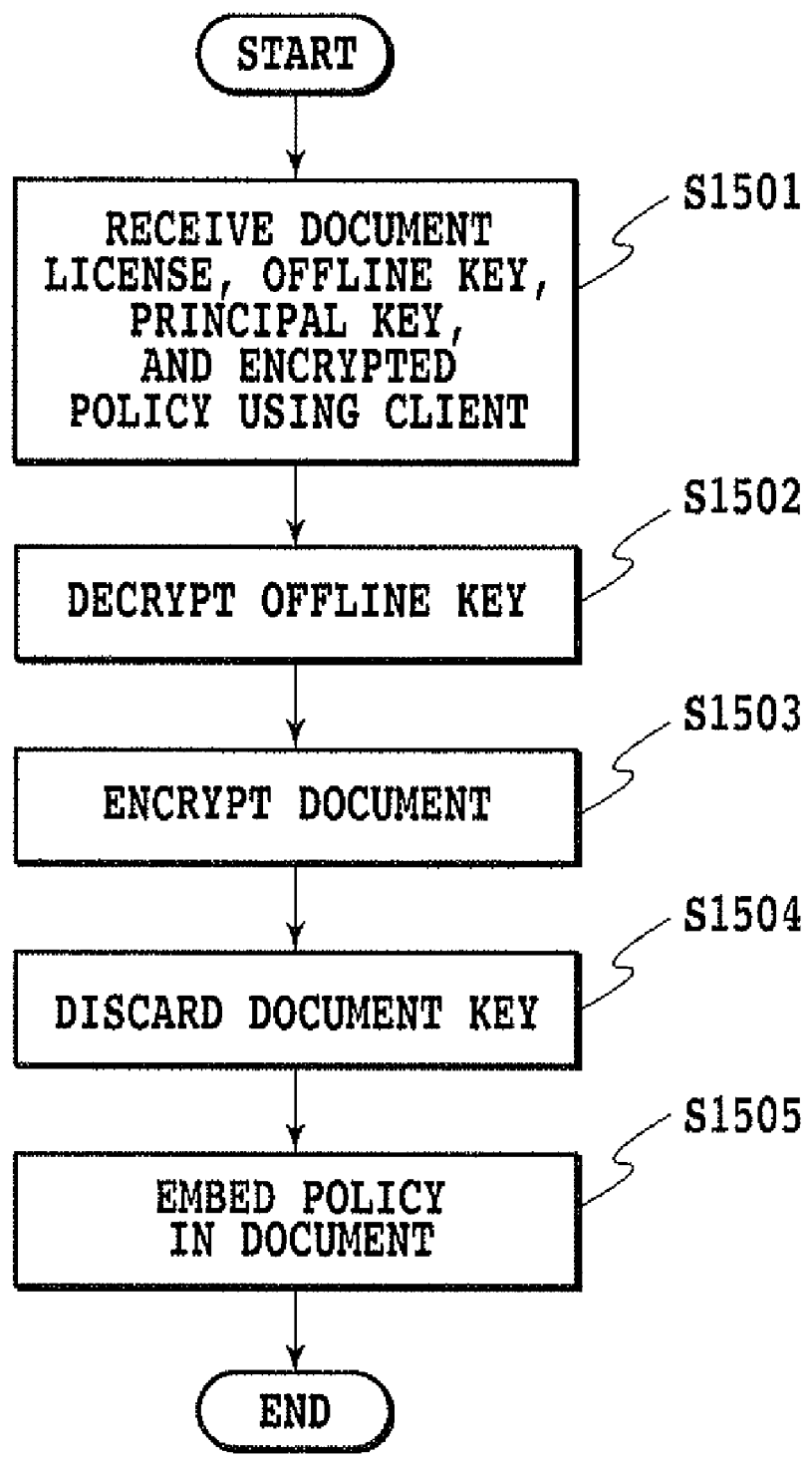
FIG. 15 is a view showing a flowchart of the client computer applying the offline policy to the document.

FIG. 14 is a flowchart of when the policy server 103 issues the offline policy, and FIG. 15 is a flowchart of when the client computer 102 applies the offline policy to the document (for example, PDF file).

Steps of applying the offline policy are basically similar to the steps of applying the online policy. However, in the case of the offline policy, stricter steps of encryption and providing signature are added in order to ensure security of the document.

When a document designation and offline policy create instructions are received from the user, a processing of S1401 is started. In S1401, the policy server 103 creates the offline policy for the designated document. Information necessary in creating the offline policy is similar to that in the case of creating the online policy in S201, but differs in that a setting of permitting the document to be used offline is included.

In S1402, the policy server 103 creates a principal key (as one type of encryption key). The principal key is created for each user who uses the document to which the offline policy is applied, and is managed by the storage device 1032 in the policy server 103 in unique association with the user information. In the principal key, a validity period in which the user can access offline the document to which the offline policy is applied is set.

In S1403, the policy server 103 creates the document license including the policy server identification information (information for uniquely identifying the policy server, e.g., IP address) and the applied policy identification information (information for identifying the policy, e.g., ID).

In S1404, the policy server 103 creates the document key (as one type of encryption key) used for encrypting the document. The document key is created for each document to which the offline policy is applied.

In S1405, the policy server 103 encrypts the document key created in S1404 using the principal key created in S1402 and creates an offline key.

In S1406, the policy server 103 encrypts the policy created in S1401 using the offline key created in S1405.

In S1407, the policy server 103 provides a digital signature to the document license and the policy to ensure consistency of data.

In S1408, the policy server 103 associates the document license, the offline key, the principal key, and the encrypted offline policy with each other and transmits them to the client computer 102. Note that the offline policy and the offline key are stored in the storage device 1032 in the policy server 103 in association with each other.

In S1501, the client computer 102 receives the document license, the offline key, the principal key, and the encrypted offline policy that are associated with each other from the policy server 103. After the reception, the user makes the designation of the specific document and issues offline policy application instructions for the document, with respect to the client computer 102 in which the software for creating and browsing a PDF file is installed. When the instructions are issued, the client computer 102 applies the offline policy to the instructed document.

A processing of the application is shown in S1502, S1503, S1504, and S1505.

First, in S1502, the client computer 102 decrypts the offline key using the principal key to acquire the document key. The principal key and the offline key are saved in the control portion 1022 in the client computer 102 even after being used for decrypting the offline key.

In S1503, the client computer 102 encrypts the document using the document key.

In S1504, the client computer 102 discards the document key when the encryption of the document is finished.

In S1505, the client computer 102 embeds the document license and the encrypted offline policy in the encrypted document. Accordingly, the processing of applying the offline policy to the document is terminated.

<Access to Document Used Offline>

Figure 16:
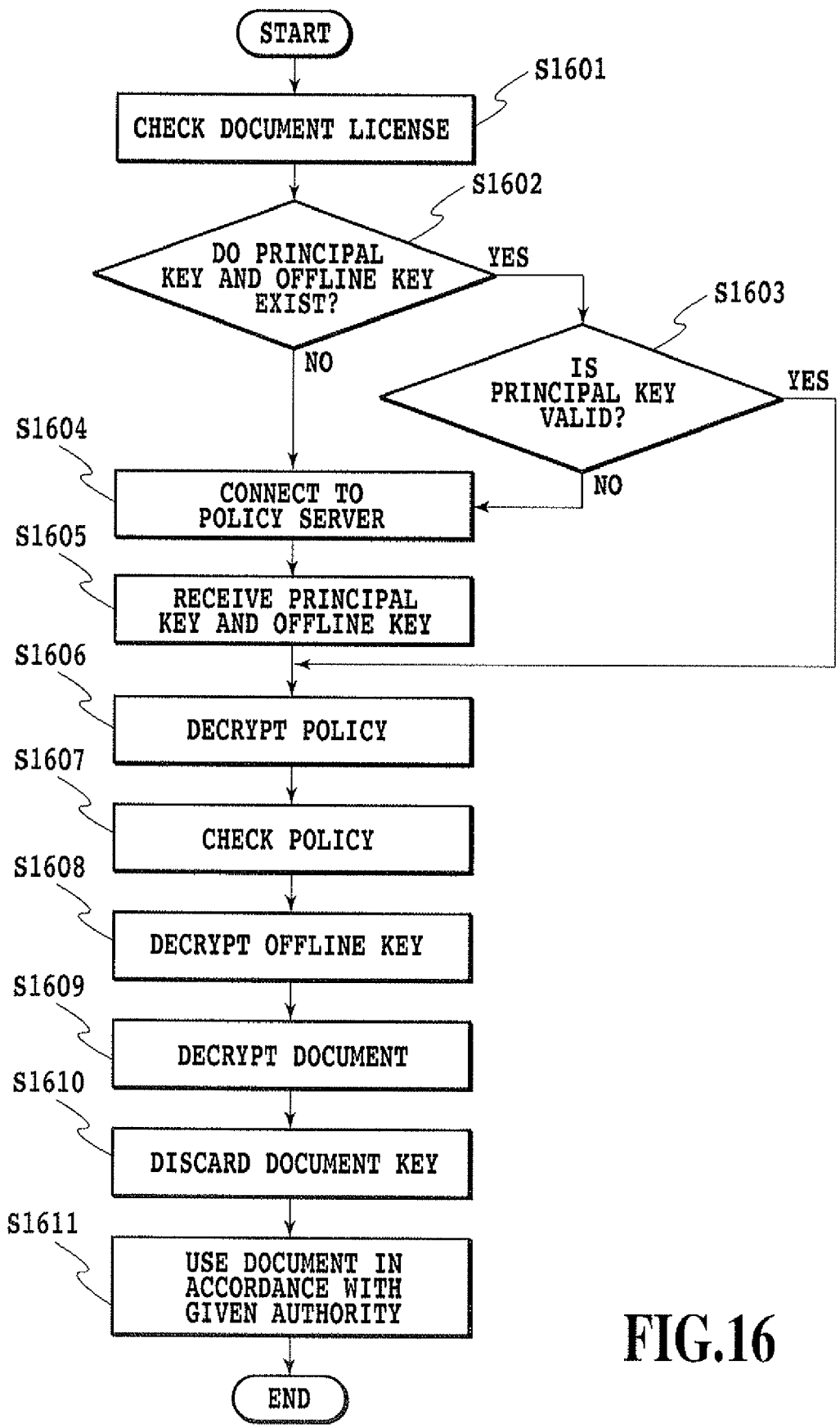
FIG. 16 is a view showing a flowchart of the client computer accessing the document to which the offline policy is applied.

FIG. 16 is a flowchart of when the document to which the offline policy is applied is accessed, the offline policy that permits the use of the document in an offline environment. Note that the principal key received in S1501 and corresponding to the document to which the offline policy is applied needs to be saved in the client computer 102 which accesses the document to which the offline policy is applied.

When the user issues instructions, to the control portion 1022, for opening the document to which the offline policy is applied, the following processing is performed.

In S1601, the client computer 102 checks the content of the document license embedded in the document, and checks whether the access to the document by the user in an offline environment is permitted.

In S1602, the client computer 102 checks whether the principal key and the offline key corresponding to the document to which the offline policy is applied exist in the control portion 1022.

In S1603, if the principal key and the offline key exist in the control portion 1022 in the client computer 102 in S1602, the validity period set for the principal key is checked.

If the principal key and the offline key do not exist in the control portion 1022 in the client computer 102 in S1602 or the validity period set for the principal key has expired in S1603, S1604 is executed.

In S1604, the control portion 1022 connects to the policy server via the network 101. Note that the control portion 1022 finds the policy and the policy server in which the policy applied to the document is saved, in accordance with the document license embedded in the document. The document license includes the policy server identification information and the policy identification information. Note that, in this embodiment, the policy server identified by the policy server identification information is the policy server 103. The policy identified by the policy identification information is the policy saved in association with the policy identification information in the storage device 1032 in the policy server 103 in S1406.

Further, when connecting, the control portion 1022 in the client computer 102 transmits the user name and the password received from the user to the policy server 103.

In S1605, the policy server 103 performs authentication with the user name sent from the control portion 1022 in the client computer 102. When the authentication succeeds, the policy server 103 transmits the principal key and the offline key associated with the policy identified (specified) by the policy identification information to the control portion 1022 in the client computer 102. Note that, when the validity period of the principal key is expired in S1603, the policy server 103 extends the validity period of the principal key, and then transmits the principal key to the control portion 1022 in the client computer 102.

In 1606, the client computer 102 decrypts the policy using the offline key.

In S1607, the client computer 102 checks the user information and access right information included in the policy, and checks the access right of the user accessing the document.

In S1608, the client computer 102 decrypts the offline key using the principal key to acquire the document key.

In S1609, the client computer 102 decrypts the document using the document key.

In S1610, the client computer 102 discards the document key.

In S1611, the client computer 102 controls the access to the document in accordance with the access right information included in the policy. The client computer 102 can execute only the processing permitted by the access right information.

In Embodiment 5, the access to the document in an offline environment is achieved in addition to the effect of Embodiment 4 by creating a policy in which the access right similar to that in Embodiment 4 is defined, as the offline policy.

[Other Embodiments]

A processing method of storing a program which achieves the function of the embodiment described above in a computer readable recording medium, reading the program stored in the recording medium as a code, and executing the program on a computer is also included in the scope of the embodiment described above. Not only the recording medium storing the program described above but also the program itself is included in the embodiment described above.

Examples of the recording medium include, for example, a floppy (registered trademark) disk, a hard disk, an optical disc, a magneto-optical disc, a CD-ROM, a magnetic tape, a nonvolatile memory card, and a ROM.

The scope of the embodiment described above is not limited to that which executes a processing with the program stored in the recording medium alone, but also includes that which operates on an OS in cooperation with alternative software and a function of an extension board to execute the operation of the embodiment described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-027697, filed Feb. 7, 2008, which is hereby incorporated by reference herein in its entirety.

What is claimed is:

1. A server connected to a different server, the different server storing information showing an access right for a document, the server comprising:

a component configured to store said document;

a component configured to store a number of accessible times for the stored document, a remainder of said number of accessible times being decremented by one when said stored document is printed;

an update instruction component configured to issue update instructions to said different server to update said information showing an access right before said stored document is downloaded to another device different from the server and the different server, said update instructions being instructions to update said information to inhibit an access to said stored document; and a comparison component configured to compare the stored number of accessible times with a number of times of previous printing of said document, wherein when a comparison result by said comparison component shows that said number of times of previous printing of said document has reached said stored number of accessible times, said update instruction component issues update instructions to said different server to update said information showing an access right, said update instructions being instructions to update said information to inhibit an access to said stored document.

2. A method of controlling an access right for a document stored in a server connected to a different server, the different server storing information showing the access right for the document, the method comprising the steps of:

storing said document;

storing a number of accessible times for the stored document, a remainder of said number of accessible times being decremented by one when said stored document is printed;

issuing update instructions to said different server to update said information showing an access right before said stored document is downloaded to another device different from the server and the different server, said update instructions being instructions to update said information to inhibit an access to said stored document; and comparing the stored number of accessible times with a number of times of previous printing of said document, wherein when a comparison result in the comparing step shows that said number of times of previous printing of said document has reached said stored number of accessible times, update instructions are issued to said different server to update said information showing an access right, said update instructions being instructions to update said information to inhibit an access to said stored document.

3. A non-transitory computer readable storage medium retrievably storing a computer program for controlling a server computer connected to a different server, the different server storing information showing an access right for a document, the computer program controlling the server to execute steps comprising:

storing said document;

storing a number of accessible times for the stored document, a remainder of said number of accessible times being decremented by one when said stored document is printed;

issuing update instructions to said different server to update said information showing an access right before said stored document is downloaded to another device different from the server and the different server, said update instructions being instructions to update said information to inhibit an access to said stored document; and comparing the stored number of accessible times with a number of times of previous printing of said document, wherein when a comparison result in the comparing step shows that said number of times of previous printing of said document has reached said stored number of accessible times, update instructions are issued to said different server to update said information showing an access right, said update instructions being instructions to update said information to inhibit an access to said stored document.

* * * * *